United States Patent [19]

Ito

[11] Patent Number: 4,696,777
[45] Date of Patent: Sep. 29, 1987

[54] COMPOSITE CERAMIC STRUCTURE AND METHOD FOR MANUFACTURING THE SAME

[75] Inventor: Shigenori Ito, Kasugai, Japan
[73] Assignee: NGK Insulators, Ltd., Japan
[21] Appl. No.: 781,713
[22] Filed: Sep. 30, 1985

[30] Foreign Application Priority Data

Oct. 4, 1984 [JP] Japan .................. 59-208962

[51] Int. Cl.$^4$ .................. C04B 33/32; C04B 37/00
[52] U.S. Cl. ........................ 264/60; 264/62; 264/313; 416/241 B
[58] Field of Search .............. 264/60, 62, 570, 313

[56] References Cited

U.S. PATENT DOCUMENTS

| | | | |
|---|---|---|---|
| 3,499,066 | 3/1970 | Murray | 264/60 |
| 3,854,189 | 12/1974 | Ezis et al. | 29/420 |
| 4,248,813 | 2/1981 | Hattori et al. | 264/62 |
| 4,396,445 | 8/1983 | Sasaki et al. | 416/241 B |
| 4,460,527 | 7/1984 | Kato | 264/60 |
| 4,552,510 | 11/1985 | Takeyuki | 264/60 |
| 4,604,252 | 8/1986 | Stigler | 264/313 |

FOREIGN PATENT DOCUMENTS 3509464  9/1985 Fed. Rep. of Germany ........ 264/62
55-134701 10/1980 Japan .

Primary Examiner—James Derrington
Attorney, Agent, or Firm—Parkhurst & Oliff

[57] ABSTRACT

A method of producing a composite ceramic structure, including: preparing a formed ceramic piece which constitutes a portion of the composite ceramic structure; preparing a rubber mold having a molding surface defining a remaining portion of the composite ceramic structure; positioning the rubber mold in contact with a joining part of the formed ceramic piece from which the remaining portion of the composite ceramic structure extends; covering an exposed surface of the formed ceramic piece, and at least an end of the rubber mold adjacent to the joining part of the formed ceramic piece, with an elastic member; filling the rubber mold with a mass of ceramic powder such that the mass of ceramic powder contacts the joining part of the formed ceramic piece, the mass of ceramic powder being substantially identical in composition with a ceramic material of which the formed ceramic piece is formed; applying a static hydraulic pressure to an assembly of the formed ceramic piece and the mass of ceramic powder in the rubber mold, thereby compacting the ceramic powder in the rubber mold and integrating the compacted mass of ceramic powder with the formed ceramic piece into an integral piece; and firing the integral piece into the composite ceramic structure.

5 Claims, 8 Drawing Figures

COMPOSITE CERAMIC STRUCTURE AND METHOD FOR MANUFACTURING THE SAME

BACKGROUND OF THE INVENTION

1. Field of the Art

The present invention relates in general to a composite ceramic structure and a method of manufacturing the same, and more particularly to an improved technique for producing such a composite ceramic structure, by first preparing a formed ceramic piece which constitutes a portion of the composite ceramic structure, then forming a mass of ceramic powder which constitutes the remaining portion of the structure such that the formed powder mass is integral with the previously prepared ceramic piece, and finally firing the formed mass of ceramic powder.

2. Related Art Statement

Silicon nitride, silicon carbide and other silicon ceramics, and ceramic materials, such as cordierite, having a low coefficient of thermal expansion are excellent in resistance to heat and thermal shock. Recently, such ceramic materials have been drawing increasing attention of the industry, as materials suitable for structural components such as gas turbines, and parts for internal combustion engines, that are used in high-temperature environments.

Generally, structural components like engine parts are complicated in construction. Therefore, it is almost impossible to produce such structural components by means of finishing, as with a grinder, fired or sintered blanks of simple configuration, e.g., in the form of rods or rectangular blocks made of fine particles of silicon nitride or silicon carbide. Further, it is extremely difficult to obtain structural components of a complicated configuration in a single molding operation. The use of these manufacturing processes is difficult particularly when the required physical properties such as strength of a ceramic structure to be produced are different from one portion to another.

In view of the above difficulties, it has been attempted to produce a composite ceramic structure by joining together two or more originally separate ceramic pieces, which are formed of suitably selected ceramic materials that meet the specific physical requirements of the respective portions of the composite structure. These separate ceramic pieces are formed in shapes corresponding to the shapes of the individual portions of the composite structure, and are joined together into the composite ceramic product, namely, an end product. For example, a method of producing such a composite ceramic structure is disclosed in Japanese Patent Application which was published in 1978 for opposition purpose under Publication No. 53-38722. This method is used to produce a rotor for an axial-flow turbine. The method comprises the steps of: preparing a vane or blade portion of the rotor with a reaction-sintered silicon nitride; placing the prepared vane portion in a mold of a hot press; and forming a rotor portion of the rotor by hot pressing, as an integral part of the vane portion. Other methods appear in Japanese Patent Applications laid open in 1980 under Publication Nos. 55-134701 and 55-161902, and Japanese Patent Application laid open in 1982 under Publication No. 57-88201. In these methods, a vane portion of a rotor is formed with an axial hole for connection to a shaft portion of the rotor which is separately prepared. The shaft portion is inserted in the axial hole, and the shaft portion and the vane portion are joined together with a suitable bonding agent, whereby a one-piece rotor structure is obtained.

Problems Solved by the Invention

However, the conventional methods for joining separate ceramic pieces into an integral end product or for forming a portion of the product integrally with a prepared ceramic piece, suffer various problems that should be solved. For example, the previously introduced former method using a hot press has potential inconveniences of relatively high production cost, and relatively low efficiency of production in a large lot size. In the latter method wherein a plurality of prepared ceramic components are joined together, the ceramic components must have a substantially equal shrinkage coefficient. Further, this latter method requires a step of joining the components with a bonding agent.

In the case where an end product is obtained by joining two prepared ceramic components, the mating or matching portions of the components must be accurately finished to avoid a gap between the joined surfaces. Even with the mating portions accurately finished, there is a possibility that air is entrapped between the finished surfaces of the components. Further, a bonding agent used to join the components may become a foreign substance to the ceramic components to be joined, which would cause cracks, porosity or other flaws in the end product.

SUMMARY OF THE INVENTION

It is accordingly an object of the present invention to provide a method of producing a composite ceramic structure, which overcomes as much as possible the conventionally encountered inconveniences. According to the present invention, there is provided a method of producing a composite ceramic structure, comprising the steps of: preparing a formed ceramic piece which constitutes a portion of the composite ceramic structure; preparing a rubber mold having a molding surface defining the remaining portion of the composite ceramic structure; positioning the rubber mold in contact with a joining part of the formed ceramic piece from which the remaining portion of the composite ceramic structure extends; covering an entire exposed surface of the formed ceramic piece, and at least an end of the rubber mold adjacent to the joining part of the formed ceramic piece, with an elastic member; filling the rubber mold with a mass of ceramic powder such that the mass of ceramic powder contacts the joining part of the formed ceramic piece, the mass of ceramic powder being substantially identical with a ceramic material of which the formed ceramic piece is formed; applying a static hydraulic pressure to an assembly of the formed ceramic piece and the mass of ceramic powder in the rubber mold, thereby compacting the ceramic powder in the rubber mold and integrating the compacted mass of ceramic powder with the formed ceramic piece into an integral piece; and firing the integral piece into a composite ceramic structure.

According to the method of the present invention as described above, a mass of ceramic powder is contacted with a previously prepared formed ceramic piece which constitutes a portion of a composite ceramic structure, for example, a vane or blade portion of a rotor which is an end product. With a static hydraulic pressure applied, the mass of ceramic powder is formed into a desired shape, for example, into a shaft portion of the rotor, and at the same time this formed mass is integrated with the formed ceramic piece into an integral piece. Thus, the desired portion of an end product, e.g., a shaft portion of a rotor, may be easily formed of ceramic powder, as an integral portion of the end product. In the instant method, a shape of a joining part of the formed ceramic piece will not have a substantive effect on the formation of the mass of ceramic powder under the static hydraulic pressure. Therefore, it is not essential to shape the joining surface of the formed ceramic piece. Further, the instant method does not use a bonding agent for joining the formed mass of ceramic powder and the formed ceramic piece, and consequently eliminates the conventionally required step of applying the bonding agent. Furthermore, the method according to the invention is effective in minimizing the conventionally experienced inconveniences such as developments of cracks, porosity or air gaps and other flaws at the interface between the formed ceramic piece and the subsequently formed mass of ceramic powder.

BRIEF DESCRIPTION OF THE DRAWINGS

The foregoing and optional objects, features and advantages of the invention will become more apparent from reading the following detailed description of the invention, when considered in connection with the accompanying drawings, in which.

DETAILED DESCRIPTION OF THE INVENTION

According to the invention, a formed ceramic piece which constitutes a portion of a ceramic end product (a composite ceramic structure) is formed by injection-molding or with other suitable known methods, using a ceramic material which is selected from $Si_3N_4$, SiC, $ZrO_2$, $Al_2O_3$, cordierite, and substances which give, by firing thereof, such ceramic materials. The formed ceramic piece thus prepared is usually a portion of the end product which has a complicated configuration, for example, a vane portion 1 of a ceramic rotor shown in FIG. 1 which includes a set of blades 2 having a complicated profile. While it is preferred that such a ceramic piece is prepared to constitute a complicated portion of an end product, it is possible to prepare a ceramic piece which constitutes a portion of the end product having a simple profile or configuration, if the end product is a relatively large ceramic article that is difficult to be formed in a single molding process.

As indicated above, the ceramic piece of an intended shape may be prepared in a common process. The prepared ceramic piece may contain a binder in a small amount, or the binder added to the ceramic powder may be removed from the formed ceramic piece. Further, the formed mass of ceramic powder may be calcined to increase the strength of the ceramic piece.

In the meantime, there is prepared a rubber mold having a molding surface defining the remaining portion of the end product, i.e., a composite ceramic structure. Subsequently, the rubber mold is positioned in pressed contact with a joining part of the already prepared formed ceramic piece. The rubber mold will be filled with a mass of ceramic powder substantially identical with the material of the ceramic piece, such that the mass of ceramic powder in the rubber mold contacts the joining part of the formed ceramic piece.

A primary component of the ceramic powder used to form the remaining portion of the ceramic end product may be substantially the same as a primary component of the previously prepared ceramic piece. For instance, the rubber mold is filled with $Si_3N_4$ when the ceramic piece is formed of $Si_3N_4$, or filled with SiC when the ceramic piece is formed of SiC.

Figure 1:
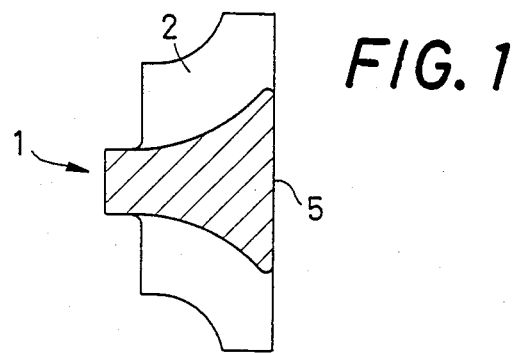
FIG. 1 is a schematic view in cross section of a vane portion of a rotor, which is an example of a formed ceramic piece of a composite ceramic structure produced according to one embodiment of the invention.
Figure 2:
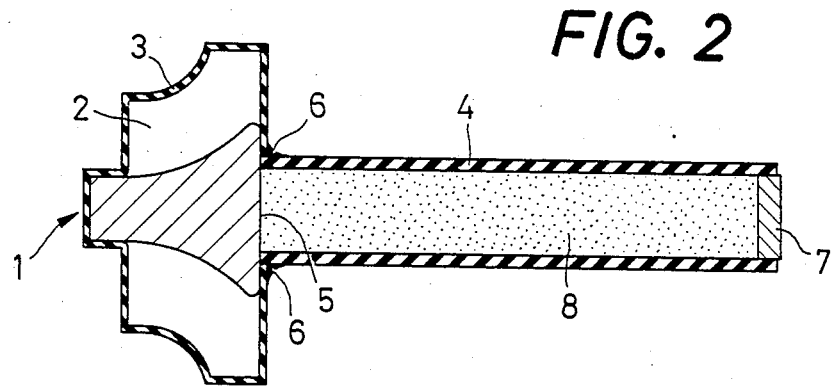
FIG. 2 is a schematic illustration in cross section, showing an assembly of the vane portion of the rotor and a rubber mold filled with a mass of ceramic powder, before the assembly is subjected to a static hydraulic pressure.

Referring to FIG. 2, there is illustrated an arrangement in which a rubber mold 4 of cylindrical shape is positioned such that its one axial end is in pressed contact with a joining part 5 of the ceramic piece in the form of the vane portion 1 of FIG. 1 of the rotor. The rubber mold 4 has an inner molding surface which defines a shaft portion of the rotor extending from the joining part 5 of the vane portion 1. The rubber mold 4 is filled with a mass of ceramic powder 8, so that the longitudinal inner end of the powder mass 8 contacts the surface of the joining part 5.

Subsequently, an entire exposed surface of the vane portion 1 and at least an end of the rubber mold 4 adjacent to the joining part 5 are covered with an elastic member 3 made of latex rubber. A sealing mass 6 of latex rubber or other suitable sealing agent is applied to a connection between the elastic member 3 and the rubber mold 4, in order to maintain a perfect sealing between the two rubber members 3 and 4. The other end of the cylindrical rubber mold 4 remote from the vane portion 1 is plugged with a rubber plug 7. Thus, the mass of ceramic powder 8 is wholly enclosed in a fluid-tight condition, whereby the powder mass 8 in the rubber mold 4 is protected against exposure to an external liquid. In this connection, the rubber mold 4 may be sealed by binding the appropriate end with a suitable means, rather than plugging the end with the rubber plug 7. As previously described, the ceramic powder 8 filling the rubber mold 4 is substantially identical in composition with the ceramic material of the ceramic piece or vane portion 1 of the rotor. While the latex rubber is used as the elastic member 3 for covering the vane portion 1, the elastic member 3 may be made from a plastic film, or may be made of other elastic or resilient materials, provided the elastic member 3 is capable of working as a medium through which a static hydraulic pressure is subsequently applied to the mass of the ceramic piece, i.e, vane portion 1 of the rotor, as will be described.

With the vane portion 1 and the mass of ceramic powder 8 covered or enclosed by the elastic member 3 and the rubber mold 4, respectively, a static hydraulic pressure may be imparted to every part of the vane portion 1 and the powder mass 8 in all directions.

As indicated above, the assembly of the formed ceramic piece covered with the elastic member, and the powder means in the rubber mold in contact with the ceramic piece, is then subjected to a compacting operation under a static hydraulic pressure, in an ordinary manner. The static hydraulic pressure is imparted to the powder mass in the rubber mold, not in a single direction but in all directions, whereby the ceramic powder mass is effectively compacted and shaped into a highly coherent body. At the same time, the thus obtained coherent body of the ceramic particles in the rubber mold is suitably integrated with the ceramic piece at its joining part.

The thus prepared integral ceramic body which consists of the ceramic piece and the compacted and formed mass of ceramic powder is then subjected to a normal sintering or firing process, and a rigid composite ceramic structure (end product) is finally obtained. Described more specifically referring to FIG. 3, a composite ceramic structure in the form of a turbocharger ceramic rotor 10 is produced. The ceramic rotor 10 consists of the vane portion 1 constituted by the previously prepared ceramic piece, and a shaft portion 9 formed of the compacted mass of ceramic powder 8 integrally with the ceramic piece.

The step of applying a static hydraulic pressure to compact the ceramic powder mass and integrate the compacted mass to the ceramic piece, may be conducted in a usual manner. The hydraulic pressure is suitably determined so as to permit the ceramic powder mass to be integrated with the ceramic powder mass of the ceramic piece, and to give the compacted ceramic powder mass required physical properties. Generally, an hydraulic pressure higher than about 1 ton/cm$^2$ is used.

Since the mass of ceramic powder is shaped in the rubber mold under a static hydraulic pressure and the shaped powder mass is formed as an intergral part of the previously prepared ceramic piece, it is not necessary to accurately finish joining surfaces of two separately prepared ceramic pieces and join these two ceramic pieces with a bonding agent, as practiced in the conventional method. While the method of the invention requires the preparation of a ceramic piece which constitutes a portion of the end product, it is not required to apply any treatment to this ceramic piece. According to the instant method, the compaction of a ceramic powder mass into a desired form and the integration of the formed ceramic powder mass with the previously prepared ceramic piece may be concurrently effected.

Since the mass of ceramic powder to form the remaining portion of the desired ceramic product is joined integrally with an appropriate joining part of the prepared ceramic piece by utilizing a static hydraulic pressure, the surface condition or configuration of the joining part of the ceramic piece is not so important. Namely, the joining surface of the ceramic piece is not limited to a flat surface as indicated at 5 in FIG. 1 of the vane portion 1 of the rotor, but may be irregular or uneven, with indentations and/or protrusions. For improved joining strength at an interface between the ceramic piece and the formed powder mass, it is rather desired that the interface be unevenly configured or provided with a convexity or concavity.

For example, it is recommended to form the ceramic piece 1 with a protrusion which provides the joining surface 5 contacting the axial end of the compacted powder mass 8. Preferably, the protrusion takes the form of a cone as indicated at 11 in FIGS. 4–6, or a truncated cone. With such a protrusion (11) extending toward the ceramic powder mass 8, the area of contact between the ceramic piece and the ceramic powder mass 8 is increased and consequently the strength at the joining interface is improved. It is noted, however, that the strength of the composite ceramic structure finally obtained by sintering the ceramic piece and the powder mass 8 is not significantly lower at the joining part (interface) than at the other parts. Generally, the strength at the joining part is gradually changed from one side of the joining part to the other side. In the case where the strength is considerably different between the two parts on the opposite sides of the joining interface, it is desired that the strength of the joining part be gradually changed from one side to the other so as to avoid a sudden change in the strength at the joining interface.

As previously indicated, the assembly of the ceramic piece and the mass of ceramic powder formed integrally with the ceramic piece is fired into an integral composite ceramic structure. The firing temperature and atmosphere are selected so as to meet the ceramic material of the assembly. In this composite ceramic structure, the protrusion such as the cone 11 formed with the ceramic piece exists in the structure so as to extend into the remaining portion of the structure which is formed of the compacted powder mass, so that the joining strength between the joined portions is increased and the composite ceramic structure is protected against cracks at the joining interface.

In the composite ceramic structure produced according to the present invention, a density of the portion formed of the ceramic piece is different from that of the portion formed of the compacted powder mass. This difference in density may be advantageously utilized for the manufacture of a ceramic rotor for a turbocharger.

Stated in more detail, the required characteristics of the vane portion 1 of the turbocharger rotor are different from those of the shaft portion 9. For example, the vane portion 1 is required to provide a high durability at an elevated temperature, while the shaft portion 1 is required to provide a high resistance to stresses at a high rotating speed, as well as a durability at a normal temperature. To this end, it is desired that the vane portion 1 and the shaft portion 9 be formed with densities of 85% or more of the theoretical density. Further, it is preferred that the density of the shaft portion 9 be higher than that of the vane portion 1. According to the present invention, the shaft portion 9 of the rotor may be easily formed to meet the above optional requirements, by adjusting the compacting conditions of the shaft portion 9 by means of a static hydraulic pressure, particularly by selecting the static hydraulic pressure, as needed. Thus, the features of the present invention may be suitably brought into play for manufacturing a ceramic rotor for a turbocharger.

The method of the invention is also suitably practiced for preparing ceramic composite structures which are T-shaped in longitudinal cross section, such as ceramic valves. Conventionally, a ceramic structure of simple configuration such as a valve is molded in one piece in a single forming process, and the molded piece is subsequently finished into an intended shape. According to the method of the invention, however, a valve head of the valve is prepared as a formed ceramic piece, and a valve stem is formed of a ceramic powder mass as an integral part of the previously prepared ceramic piece, so that the formed ceramic piece and the formed ceramic powder mass cooperate to constitute the composite valve structure substantially in its intended final shape.

Advantages of the Invention

According to the present invention, as described hitherto, there is first prepared a ceramic piece which, when fired, will give a portion of a desired composite ceramic structure, and a mass of ceramic powder is formed under application of a static hydraulic pressure, integrally with the prepared ceramic piece, so as to extend from an appropriate portion of the ceramic piece. This method is contrary to a conventional method in which two prepared ceramic pieces are joined together into an end composite product, or in which a molded ceramic article is processed into a final shape. Accordingly, the instant method makes it possible to save a material for a composite ceramic product, simplify an overall manufacturing process of the product, and consequently reduce its cost of manufacture and improve productivity. In other words, the method of the invention eliminates not only preliminary treatments such as precise finishing of joining parts of the two separate ceramic pieces, or application of a bonding agent to the joining surfaces, but also post-molding or post-firing steps required to finish the molded or fired ceramic mass into a desired final configuration.

In addition, the present method uses no bonding agent at a joining interface between the previously prepared ceramic piece and the subsequently formed ceramic powder mass. Therefore, the composite ceramic structure or product manufactured according to the invention has substantially no chance of cracks, air gaps or porosity, or other flaws due to the use of a bonding agent at the joining interface.

In the present invention, a composite ceramic structure is not produced by joining two molded solid ceramic members. Instead, the composite structure is obtained by forming a mass of ceramic powder into a desired shape and integrating the formed ceramic powder mass with a previously molded solid ceramic member. Accordingly, the present invention perfectly eliminates the conventional requirements for avoiding differences in shrinkage during molding and firing between the plurality of ceramic members. Namely, the method of the invention does not suffer the conventional restriction or limitation in the material of one ceramic member, by the shrinkage coefficient of the other ceramic member, which restriction does not allow the use of a ceramic material which best meets the required properties of a corresponding portion of the end product.

In summary, the conventional problem due to a difference in shrikage during manufacture between two portions of a ceramic end product will not occur in the method of the instant invention wherein a mass of ceramic powder is formed in a desired shape and integrated with a previously prepared ceramic piece at an appropriate portion of the latter, under a static hydraulic pressure. Hence, for example, it is possible to use ceramic powders of different grain sizes for the previously formed ceramic piece, and the ceramic powder mass which is subsequently formed integrally with the ceramic piece. Even in this case, the end product will not have defects due to the different grain sizes. Furthermore, the instant method has an extremely greater allowance of a difference in shrinkage during firing of the ceramic piece and the subsequently formed ceramic powder mass, as compared with the conventional method of joining two or more formed ceramic pieces. Accordingly, the present method permits a free selection of a suitable ceramic powder for a portion of a desired composite ceramic structure which is formed integrally with a previously formed ceramic piece. Hence, the portion of the end product which is formed with the previously formed ceramic piece may exhibit the desired physical properties.

While the method of the present invention is suitable for manufacturing various ceramic parts for engines, such as ceramic rotors for turbochargers and axial-flow turbines, and ceramic valves, it is equally applicable to ceramic articles of simple configuration which are conventionally produced by processing an integrally molded piece into an intended final shape. Thus, the present invention makes it possible to reduce material loss and processing time.

EXAMPLES

To further illustrate the concept of the present invention, there will be described several examples of producing composite ceramic structures according to the invention. It is to be understood, however, that the invention is not confined to the details of the examples. Rather, the invention may be embodied with various changes and modifications which may occur to those skilled in the art without departing from the spirit of the present invention. Oviously, those modified embodiments fall within the scope of the invention.

EXAMPLE 1

A mass of 100 parts by weight of $Si_3N_4$ of an average grain size of 1 $\mu$m was mixed uniformly with sintering aids which consist of 3 parts by weight of MgO, 2 parts by weight of SrO and 4 parts by weight of $CeO_2$. The thus prepared ceramic powder mixture was divided into two equal parts, one part of which was used as a ceramic powder material A to prepare a ceramic piece. The other part was used as a ceramic powder material B for provide a formed powder mass to be joined integrally with the prepared ceramic piece.

More specifically described referring to FIG. 1, the ceramic powder material A was used to prepare the vane portion 1 of a turbocharger ceramic rotor. As injection-molding aids, 15 parts by weight of polyethylene wax and 2 parts by weight of stearic acid were added to 100 parts by weight of the ceramic powder material A. By using a kneader, the mixture was then kneaded under pressure, and a ceramic material was obtained in the form of pellets. The pellets were injection-molded into the ceramic piece corresponding to the vane portion 1 of the turbocharger rotor of FIG. 1. The injection-molding was effected at an injection temperature of 130° C. and with an injection pressure of 1 ton/cm$^2$, and with a mold temperature of 50° C., so that the vane portion 1 to be obtained had a diameter of 60 mm at its blade portion 2, and the blade portion 2 had a wall thickness (minimum thickness) of 0.7 mm. The molded ceramic piece 1 was subsequently heated in an electric furnace of the type in which heated air is circulated. The temperature in the furnace was elevated from room temperature to 400° C. at a rate of 5° C./hour, and the ceramic piece 1 was kept at 400° C. for five hours. Thus, the intended formed ceramic piece (hereinafter referred to as vane portion 1) was finally prepared.

Subsequently, the prepared vane portion 1 was covered with a layer of latex rubber 3, except a joining surface 5 at which the vane portion 1 is contacted with a ceramic powder mass 8 which will be formed of the previously indicated ceramic powder material B to form the shaft portion 9 of the ceramic rotor, as described below referring to FIG. 2. The cylindrical rubber mold 4 was positioned such that its one axial end was held in pressed contact with the joining surface 5 of the vane portion 1, and the contacting parts of the rubber layer 3 and the rubber mold 4 were sealed with the latex rubber mass 6. Successively, the rubber mold 4 thus positioned relative to the vane portion 1 was filled with the ceramic powder material B (ceramic powder 8) so that the inner end of the ceramic powder mass 8 contacted the joining surface 5 of the vane portion 1. Then, the axial end of the rubber mold 4 remote from the vane portion 1 was closed by the rubber plug 7.

Successively, the assembly of the vane portion 1 and the rubber mold 4 filled with the ceramic powder mass 8 was subjected to a static hydraulic pressure of 2 tons/cm$^2$, whereby the ceramic powder mass 8 was compacted and shaped as an integral part of the vane portion 1. Thus, an integrally molded ceramic piece (for a turbocharger ceramic rotor) was obtained. It was found that the molded ceramic piece had no cracks at all, even at or around the joining surface 5 between the vane portion 1 and the shaft portion 9 formed of the ceramic powder mass 8 (powder material B).

The obtained integral ceramic piece was then fired or sintered in a $N_2$ atmosphere at 1700° C. for 30 minutes. Thus, the intended composite ceramic structure, that is, a fired body of the turbocharger ceramic rotor, was finally produced. An external observation of the fired body revealed no cracks at all at any parts of the fired ceramic rotor.

Figure 3:
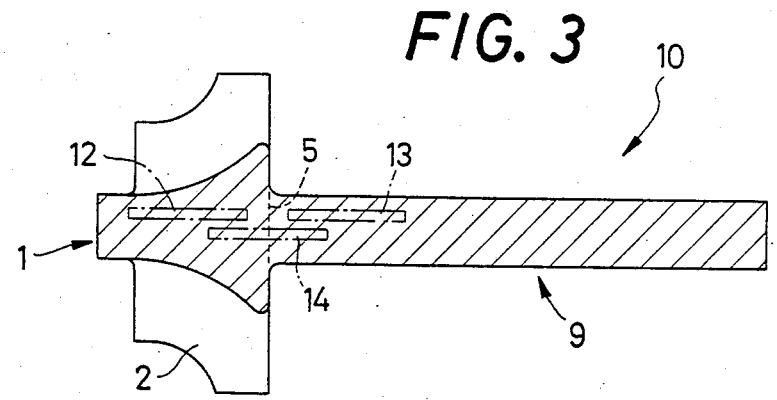
FIG. 3 is a schematic illustration in cross section, showing the assembly of FIG. 2 after the assembly is subjected to the static hydraulic pressure and is fired.

For conducting a test to check the produced rotor for strength to bending stresses, three test pieces 12, 13 and 14 (3 mm × 3 mm × 30 mm) were obtained by cutting the ceramic rotor, as indicated in broken line in FIG. 3. As shown in the figure, the test piece 12 was a part of the vane portion 1 (previously formed ceramic piece), while the test piece 13 was a part of the shaft portion 9 formed of the ceramic powder mass 8 (powder material B). The test piece 14 consisted of a part of the vane portion 1 and a part of the shaft portion 9. These test pieces 12, 13 and 14 were subjected to a four-point bending test.

The results of the bending test are indicated in Table 1. As is understood from the table, the three parts of the ceramic rotor corresponding to the test pieces 12–14 showed substantially the same bending strength. Further, the test indicated no reduction in strength at the joining part bridging the vane and shaft portions 1 and 9.

TABLE 1

| Test Pieces (Parts of the rotor) | Bending Strength (kg/mm$^2$) |
| --- | --- |
| 12 | 68 |
| 13 | 70 |
| 14 | 69 |

EXAMPLE 2

A mass of 100 parts by weight of $Si_3N_4$ of an average grain size of 1 μm was mixed uniformly with sintering aids which consist of 3 parts by weight of MgO, 2 parts by weight of SrO and 4 parts by weight of $CeO_2$. The thus prepared ceramic powder mixture was used as a ceramic powder material A to prepare a ceramic piece. Additionally a mass of 100 parts by weight of $Si_3N_4$ of an average grain size of 0.6 μm was mixed uniformly with sintering aids which consist of 4 parts by weight of MgO, 2 parts by weight of SrO and 3 parts by weight of $CeO_2$. The thus prepared ceramic powder mixture was used as a ceramic powder material C for a ceramic powder mass to be formed integrally with the ceramic piece.

Figure 4:
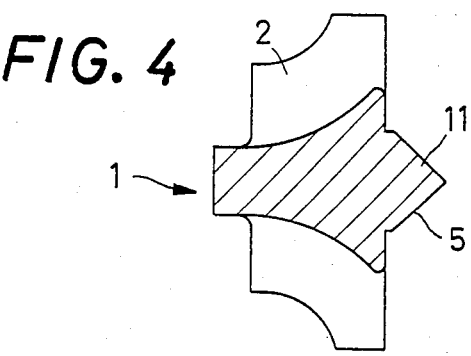
FIGS. 4, 5 and 6 are views corresponding to FIGS. 1, 2 and 3, respectively, showing another embodiment of the invention.

More specifically described referring to FIG. 4, the ceramic powder material A was used to prepare the vane portion 1 of a turbocharger ceramic rotor including the protrusion 11 which has the joining surface 5 at which the shaft portion of the rotor is formed. As injection-molding aids, 15 parts by weight of polyethylene wax and 2 parts by weight of stearic acid were added to 100 parts by weight of the ceramic powder material A. By using a kneader, the mixture was then kneaded under pressure, and a ceramic material was obtained in the form of pellets. The pellets were injection-molded into the ceramic piece corresponding to the vane portion 1 of the turbocharger rotor of FIG. 4. The injection-molding was effected at an injection temperature of 150° C. and with an injection pressure of 1 ton/cm$^2$, and with a mold temperature of 50° C., so that the vane portion 1 to be finally obtained has a diameter of 60 mm at its blade portion 2, and the blade portion 2 has a wall thickness (minimum thickness) of 0.7 mm. The molded ceramic piece 1 was subsequently heated in an electric furnace of the type in which heated air is circulated. The temperature in the furnace was elevated from room temperature to 400° C. at a rate of 5° C./hour, and the molded piece 1 was kept at 400° C. for five hours. Thus, the intended formed ceramic piece (hereinafter referred to as vane portion 1) was finally prepared.

Figure 5:
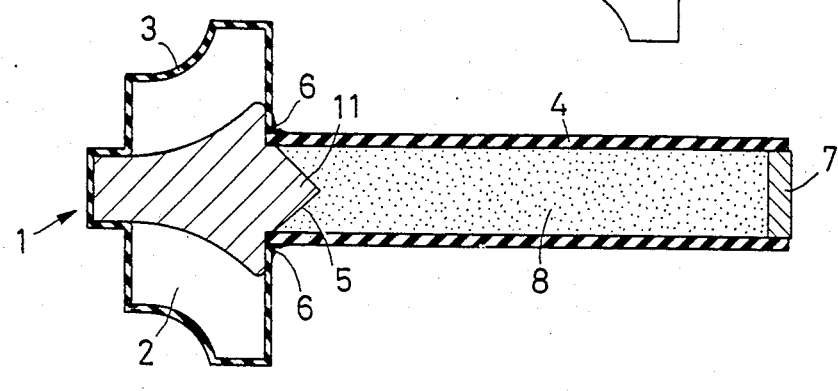
Figure 6:
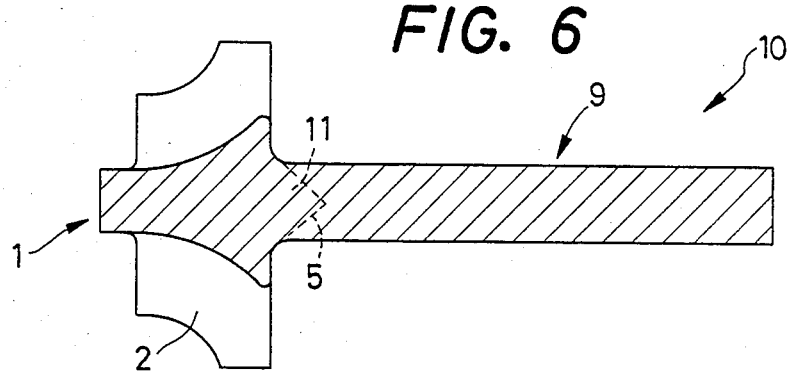

Successively, the prepared vane portion 1 was covered with the latex rubber layer 3, except the joining surface 5 at which the vane portion 1 is contacted with the ceramic powder mass 8 to be formed of the previously indicated ceramic powder material C to form the shaft portion 9 of the ceramic rotor, as described below referring to FIG. 5. The cylindrical rubber mold 4 was positioned such that its one axial end was held in pressed contact with the joining surface 5 of the vane portion 1, and the contacting parts of the rubber layer 3 and the rubber mold 4 were sealed with the latex rubber mass 6. Subsequently, the rubber mold 4 thus positioned relative to the vane portion 1 was filled with the ceramic powder material C (ceramic powder mass 8) so that the inner end of the ceramic powder mass 8 contacted the joining surface 5 of the protrusion 11 of the vane portion 1. Then, the axial end of the rubber mold 4 remote from the vane portion 1 was closed by the rubber plug 7.

Successively, the assembly of the vane portion 1 and the rubber mold 4 filled with the ceramic powder mass 8 was subjected to a static hydraulic pressure of 2 tons/cm$^2$, whereby the ceramic powder mass 8 of the powder material C was compacted and shaped as an integral part of the ceramic piece. In other words, the shaft portion 9 was formed with the vane portion 1 integrally at its protrusion 11. Thus, an integrally molded piece of the turbocharger ceramic rotor was obtained. It was found that the molded piece had no cracks at all, even at or around the joining surface 5 between the vane portion 1 and the shaft portion 9 formed of the ceramic powder mass 8 (powder material C).

The obtained integral ceramic piece was then fired or sintered in a $N_2$ atmosphere at 1700° C. for 30 minutes. Thus, the intended composite ceramic structure, that is, a fired body of the turbocharger ceramic rotor, was finally produced. An external observation of the fired body revealed no cracks at all at any parts of the fired ceramic rotor.

For conducting a test to check the produced rotor for strength to bending stresses, three test pieces (3 mm$\phi\times$30 mm) were obtained by cutting off a part of the vane portion 1 (previously formed ceramic piece), a part of the shaft portion 9 formed of the ceramic powder mass 8, and a part of the ceramic rotor at which the two portions 1, 9 were joined together. These test pieces were subjected to a three-point bending test. Further, the densities of the test pieces were measured. The results of the bending test and the measurements of the densities of the test pieces are indicated in Table 2.

TABLE 2

| Test Pieces | Bending Strength (kg/mm$^2$) | Density* |
| --- | --- | --- |
| Vane portion 1 | 72 | 93% |
| Shaft portion 9 | 105 | 96% |
| Joining part | 75 | 94% |

*Percentage of the theoretical density

As is understood from the above table, the shaft portion 9 formed of the ceramic powder mass 8 (powder material C) under a static hydraulic pressure exhibited an extremely higher bending strength than the vane portion 1. In addition, the shaft portion 9 showed a higher density than the vane portion 1.

EXAMPLE 3

A mass of 100 parts by weight of $ZrO_2$ of an average grain size of 1 $\mu$m was mixed uniformly with 5 parts by weight of $Y_2O_3$. The thus prepared ceramic powder mixture was divided into two equal parts, one part of which was used as a ceramic powder material D to prepare a ceramic piece. The other part was used as a ceramic powder material E for forming a shaped powder mass to be joined integrally with the prepared ceramic piece. Subsequently, a mass of 100 parts by weight of the powder material D was mixed with 1 part by weight of sodium alginate as a slip-casting aid, and 55 parts by weight of water. The mixture was stirred into a slurry. The slurry was used to prepare a head portion 16 of an intake valve (or exhaust valve) 15 of FIGS. 7(a) and 7(b) for an engine. More specifically, the prepared slurry was poured into a cavity of a plaster mold to form the head portion 16 of the intake valve 15. The molded piece was then dried at 100° C. for three hours, and an intended ceramic piece (head portion 16) was prepared.

Figure 7A:
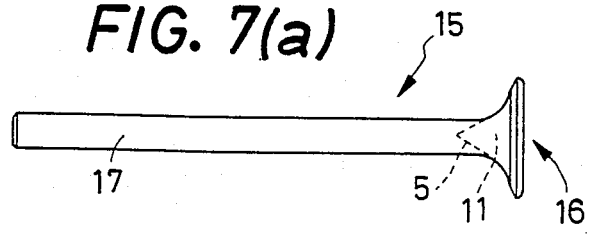
FIGS. 7(a) and (b) are front and right end elevational views, respectively, showing a composite ceramic structure in the form of a valve produced according to the invention.
Figure 7B:
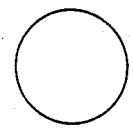

The prepared head portion 16 was covered with a latex rubber layer, except the joining surface 5 at which the head portion 16 is contacted with a mass of the ceramic powder material E to form a stem portion 17 of the intake valve 15 as shown in FIG. 7(a). To form the stem portion 17, a tubular rubber mold was positioned such that its one axial end was held in pressed contact with the joining surface 5 of the head portion 16, and the contacting parts of the latex rubber layer and the rubber mold were sealed with a mass of latex rubber. Subsequently, the rubber mold thus positioned relative to the head portion 16 was filled with the ceramic powder material E so that the inner end of the ceramic powder mass E contacted the joining surface 5 of the head portion 16. Then, the axial end of the tubular rubber mold remote from the head portion 16 was closed with a rubber band.

Successively, the assembly of the head portion 16 and the rubber mold filled with the ceramic powder material E was subjected to a static hydraulic pressure of 5 tons/cm$^2$, whereby the ceramic powder mass E was compacted and shaped as an integral part of the head portion 16. Thus, an integrally molded piece of the intake valve 15 was obtained. The molded piece was fired in an electric furnace at 1500° C. for one hour, whereby a desired composite ceramic structure, i.e., a fired body of the intake valve 15 was produced. It was found that the intake vale 15 had no defects at all any parts thereof.

EXAMPLE 4

A mass of 100 parts by weight of $Si_3N_4$ of an average grain size of 1 $\mu$m was mixed uniformly with sintering aids which consist of 3 parts by weight of MgO, 2 parts by weight of SrO and 4 parts by weight of $CeO_2$. The thus prepared ceramic powder mixture was divided into two equal parts, one part of which was used as a ceramic powder material F to prepare a ceramic piece. The other part was uses as a ceramic powder material G for providing a formed powder mass to be joined integrally with the prepared ceramic piece.

Successively, a mass of 100 parts by weight of the powder material F was mixed with injection-molding aids which consist of 12 parts by weight of microcrystalline wax, 3 parts by weight of polyethylene and 2 parts by weight of stearic acid. By using a kneader, the mixture was then kneaded under pressure, and a ceramic material was obtained in the form of pellets. The pellets were injection-molded into the ceramic piece corresponding to the head portion 16 of the intake valve 15 of FIGS. 7(a) and 7(b). The injection-molding was effected at an injection temperature of 150° C. and with an injection pressure of 1.5 ton/cm$^2$, and with a mold temperature of 50° C. The molded piece was subsequently placed in an electric furnace of hot-air circulating type. The temperature in the furnace was elevated from room temperature to 400° C. at a rate of 10° C./hour. The molded piece was kept at 400° C. for five hours, whereby the binder contained in the molded piece 16 was removed. Then, the ceramic piece was calcined in a $N_2$ atmosphere at 800° C. for one hour. Thus, the intended ceramic piece (hereinafter referred to as head portion 16) was finally prepared.

Subsequently, the prepared head portion 16 was covered with a latex rubber layer, except the joining surface 5 at which the head portion 16 is contacted with a mass of the ceramic powder material G to form the stem portion 17 of the intake valve 15 as shown in FIG. 7(a). To form the stem portion 17, a tubular rubber mold was positioned such that its one axial end was held in pressed contact with the joining surface 5 of the head portion 16, and the contacting parts of the latex rubber layer and the rubber mold were sealed with a mass of latex rubber. Subsequently, the rubber mold thus positioned relative to the head portion 16 was filled with the ceramic powder material G so that the inner end of the ceramic powder mass G contacts the joining surface 5 of the head portion 16. Then, the axial end of the tubular rubber mold remote from the head portion 16 was closed with a rubber band.

Successively, the assembly of the head portion 16 and the rubber mold filled with the ceramic powder material G was subjected to a static hydraulic pressure of 5 tons/cm$^2$, whereby the ceramic powder mass G was compacted and shaped as an integral part of the head portion 16. Thus, an integrally molded piece of the intake valve 15 was obtained. The molded piece was fired in a N$_2$ atmosphere in an electric furnace at 1700° C. for 30 minutes, whereby a desired composite ceramic structure, i.e., a fired body of the intake valve 15 was produced. It was found that the intake valve 15 had no defects at all any parts thereof.

What is claimed is:

1. A method of producing a composite ceramic structure, comprising the steps of:

preparing a formed ceramic piece which constitutes a first portion of said composite ceramic structure; preparing a rubber mold having a molding surface defining a remaining portion of said composite ceramic structure; positioning said rubber mold in contact with a joining part of said formed ceramic piece from which said remaining portion of the composite ceramic structure extends; covering an entire exposed surface of said formed ceramic piece, and at least an end of said rubber mold adjacent to said joining part of the formed ceramic piece, with an elastic member; filling said rubber mold with a mass of ceramic powder such that the mass of ceramic powder contacts said joining part of said formed ceramic piece, said mass of ceramic powder being substantially identical with a ceramic material of which said formed ceramic piece is formed; applying a static hydraulic pressure to an assembly of said formed ceramic piece and said mass of ceramic powder in said rubber mold, thereby compacting said ceramic powder in said rubber mold and integrating the compacted mass of ceramic powder with said formed ceramic piece into an integral piece; and firing said integral piece to form said composite ceramic structure.

2. A method according to claim 1, wherein said joining part of the formed ceramic piece includes a section which protrudes from a surface of the formed ceramic piece with which said rubber mold is positioned in contact.

3. A method according to claim 1, wherein said elastic member comprises a latex rubber material.

4. A method according to claim 1, wherein said composite ceramic structure comprises a ceramic material selected from the group consisting of Si$_3$N$_4$, SiC, ZrO$_2$, Al$_2$O$_3$, cordierite, and substances which result in, by firing thereof, Si$_3$N$_4$, SiC, ZrO$_2$, Al$_2$O$_3$ and cordierite.

5. A method according to claim 1, wherein said composite ceramic structure comprises a turbocharger rotor, and said formed ceramic piece is a vane portion of the turbocharger rotor.

* * * * *